United States Patent [19]

Templeton

[11] Patent Number: 5,867,937
[45] Date of Patent: Feb. 9, 1999

[54] METHOD FOR DECREASING HYDROPHOBICITY OF PEAT, BARK AND ROCKWOOL IN SOILLESS MIXES USED FOR PLANT GROWTH, PROMOTING EASIER, FASTER AND MORE EVEN WATERING OF SUCH MIXES WITHOUT PLANT INJURY AND PROVIDING ACTIVITY FOR FUTURE WATERING

[75] Inventor: Andrew Robert Templeton, Vincentown, N.J.

[73] Assignee: Smithers-Oasis Company, Cuyahoga Falls, Ohio

[21] Appl. No.: 880,824

[22] Filed: Jun. 24, 1997

Related U.S. Application Data

[63] Continuation of Ser. No. 407,493, Mar. 17, 1995, abandoned, which is a continuation of Ser. No. 36,339, Mar. 24, 1993, abandoned.

[51] Int. Cl.[6] ............................. A01B 79/00; A01G 31/00
[52] U.S. Cl. ..................... 47/59; 47/1.4; 47/58; 47/60; 47/64; 47/41.01; 47/DIG. 9; 47/DIG. 10; 252/183.13; 252/313.2; 252/351; 252/363.5; 510/340; 510/422; 510/511
[58] Field of Search ............................. 252/351, 363.5, 252/183.13, 313.2; 510/422, 511, 340; 47/1.4, 58, 59, 60, 64, 41.01, DIG. 10, DIG. 9

[56] References Cited

U.S. PATENT DOCUMENTS

| | | | |
|---|---|---|---|
| 2,674,619 | 4/1954 | Lundsted | 260/485 |
| 2,677,700 | 5/1954 | Jackson et al. | 260/488 |
| 3,036,118 | 5/1962 | Jackson et al. | 260/484 |
| 3,812,619 | 5/1974 | Wood et al. | 47/58 |
| 3,973,355 | 8/1976 | McKenzie | 47/59 |
| 4,269,068 | 5/1981 | Molina et al. | 252/301.19 |
| 4,492,646 | 1/1985 | Welch | 510/237 |
| 4,764,567 | 8/1988 | Ott | 525/403 |
| 5,152,933 | 10/1992 | Holland | 510/340 |
| 5,273,677 | 12/1993 | Arif | 510/514 |

OTHER PUBLICATIONS

Bunt, A.C., "3.4 Water absorption and Release by Composts" *Modern Potting Composts* 1976 The Penn. St. Univ. Press, University Park, pp. 50–53 (author unknown) Surfactants and Detersive Systems Encyclopedia of Chemical Technology (Date unknown) John Wesley pp. 360–365.

*Primary Examiner*—Herbert J. Lilling
*Attorney, Agent, or Firm*—Renner, Kenner, Greive Bobak, Taylor & Weber

[57] ABSTRACT

A novel and improved method for relieving hydrophobicity of peat moss, bark and rockwool used in horticultural media for plant propagation using an effective level of a composition consisting of certain copolymerized alkane oxides is described. A more effective method of delivering these materials based on a composition of hydrous, amorphous silica using the compositions of the present invention is described.

2 Claims, No Drawings

METHOD FOR DECREASING HYDROPHOBICITY OF PEAT, BARK AND ROCKWOOL IN SOILLESS MIXES USED FOR PLANT GROWTH, PROMOTING EASIER, FASTER AND MORE EVEN WATERING OF SUCH MIXES WITHOUT PLANT INJURY AND PROVIDING ACTIVITY FOR FUTURE WATERING

This is a continuation of application Ser. No. 08/407,493 filed on Mar. 17, 1995, now abandoned, which is a continuation of application Ser. No. 08/036,339 filed on Mar. 24, 1993, now abandoned.

BACKGROUND OF THE INVENTION

Products normally used in the production of soiless mixes for greenhouse crop production are often water repellent (hydrophobic) in nature. The hydrophobic surface chemistry of these materials, particularly those from organic sources, is somewhat peculiar and does not relate well to other surfaces. Such components as sphagnum peat moss, hypnum peat moss, reed-sedge peat, composted bark and rockwool which are used in such growing mixes to increase their water holding capacity often become very difficult to wet defeating the purpose for which they were originally intended. The difficulty in wetting increases as the mix dries out normally in storage after preparation or when used to pre-fill pots and flats by the grower and stored for some time before use. This situation presents many problems to the grower as getting the mix evenly wetted is of paramount importance to the healthy growth of the plants or seeds which are grown in the mix. Without water the plants will die.

A possible answer to this problem is to add an appropriate surfactant to the mix to reduce surface tension between the applied water and the hydrophobic mix components. The use of materials currently in commerce is not entirely satisfactory. Relatively high rates of these materials are required to get good wetting properties of the mix and at such rates can be injurious to crop growth. Furthermore, the conventional dry formulations of these materials based on corn cob grits and vermiculite do not work well as the surfactant must first be dissolved from these carriers and bind to the hydrophobic surfaces of the peat, rockwool or bark before they become activated. Consequently, several waterings are normally required before they become active. Furthermore there is an environmental concern as the described compounds contain nonyl-phenol ethoxylates or other mono or di-alkyl phenol ethoxylates. The conjenors of such compounds are known to bioaccumulate in the biosphere with deleterious effects on fresh water crustaceans and their use has been banned in many countries.

The majority of the surfactants currently discovered and developed have been designed to give fast wetting as they are used as cleansers, soaps and detergents. The problem with greenhouse mixes is that fast wetting is not necessarily desirable as they would have to be applied with each watering. What is more desirable is rewetting of the peat or other substances following treatment with a surfactant giving residual activity.

Unfortunately many such surfactants can also have biological activity. They can, in fact, be detrimental to plant growth and many are actually fatal and can act as herbicides. Others have other biological activity and can cause death of insects. Many of these compounds we have previously tested were found to interfere with seedling growth. I have shown earlier that such materials act by disrupting membrane integrity as the hydrophobe bonds to the phospholipid Membrane of the cell wall. Others can act as plant growth regulators and while their use may be beneficial in achieving certain results they cause undesirable effects in greenhouse crop production.

Furthermore, if the selected surfactant is to remain active in the mix beyond the initial watering it is desirable that the hydrophobe of the surfactant bond tightly to the hydrophobic mix component and not leach out when plants are repeatedly watered.

In addition, it is highly desirable that such a surfactant be compatible with fertilizers and other water soluble chemical charge stocks used in preparation of the final horticultural mix.

Although such materials may be applied as a liquid it is also desirable that they may be presented in a dry formulation for ease of application and use by the grower. This creates an additional problem in that most carriers commonly used such as vermiculite, corn cob grits, clay and so forth also absorb the surfactant or tightly bind them to their surfaces making it necessary for the surfactant to first be dissolved from the carrier before it can become active.

Although there are over 4000 surfactants currently in commercial use the discovery of such a surfactant for use in soiless mixes such as root media is therefore not a trivial problem as it must meet certain specific and difficult criteria, namely:

(1) Be compatible with the surface chemistry of peat, rockwool and bark, (2) Safe for plant growth, particularly seed germination and seedling growth, (3) Bind tightly to mix components so that it is not leached from the matrix following watering and have residual activity for a full normal cropping season.

(4) Give not only fast initial wetting but also and more importantly rewetting after application to the mix components, (5) Be compatible with fertilizers and other chemical components and (6) Have ease of application and be effective in both a liquid and solid formulation.

Surprisingly we have found that certain surfactants belonging to the general class of polyoxyalkylenes meet conditions 1, 2, 3 and 4 and that specific formulations of some members of this class meet conditions 5 and 6. Furthermore, these materials are superior in all six respects to known products used for this utility and which are now commercially available.

Surfactants of this type are described in U.S. Pat. Nos. 4,764,567, 3,086,118, 2,677,700 and 2,674,619. These patents teach us the preparation and use of such materials as surface active agents for use as cleansers and detergents and as wetting agents in the textile, rubber, paper, lacquer, leather and like industries but no mention is made of their use in soils or soiless horticultural media nor in their interaction with living organisms nor for general applications in the Agricultural or Horticultural industries. Furthermore, despite the age of these patents their use for such utilities is unknown.

To date, no correlation has been shown between a chemical structure of a particular class of surfactants and its phytotoxicity (in this case crop safety) to seed germination and plant growth. Indeed the converse is true with most surfactants known to be injurious to plants. This is not surprising as surfactants in general because of their solubilizing and dispersing nature will dissolve plant cuticles, interfere with plant membranes and generally disrupt membrane integrity in tender plant tissue as their hydrophobes will bond to such lipophyllic organs found in plants such as emerging roots, root hairs, radicles and hypocotyls. The discovery of such surfactants which will maintain good wetting properties in the surrounding media without interfering with plant growth is therefore surprising and unusual.

SUMMARY OF THE INVENTION

This invention relates to a novel method for relieving hydrophobicity of components such as peat, bark, rockwool and the like used in horticultural mixes for their water holding capacity and making them easy to wet without causing plant injury at the recommended rates and with a very high margin of crop safety. Of specific interest are polyoxyalkylenes of reacted ethylene and propylene oxides and ethoxylated, propoxylated alcohols with having a molecular weight greater than 2000. Particular compositions described in the invention have been developed which overcome the inherit problems of the parent chemistry in being compatible with fertilizers and other like components used in crop production. A particular composition which is based on the use of hydrous, amorphous silica, a non-metallic oxide, in combination with such polymers of ethylene and propylene oxides having a molecular weight greater than 2000 has been shown to be particularly effective for use in soiless mixes consisting of peat, rockwool, bark and the like and overcomes problems with existing products based on vermiculite, corn cob grits and other similar materials now commonly used.

In accordance with this invention the above-desirable effects may be obtained by applying to soiless mixes such as root media at preparation, or during the course of crop production, of an appropriate amount of certain surfactants, represented in Formulas (I), (II) and (II). Preferred compounds are those represented in Formulas (II and III).

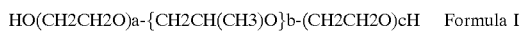

HO(CH2CH2O)a-{CH2CH(CH3)O}b-(CH2CH2O)cH  Formula I

Where b=% and ranges from 10–20 and a+c=MW Ethylene Oxide and is 1900–2000.

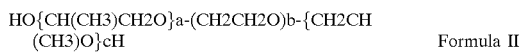

HO{CH(CH3)CH2O}a-(CH2CH2O)b-{CH2CH(CH3)O}cH  Formula II

Where b=% and ranges from 10 to 80 and a+c=MW of Propylene oxide and ranges from 1700 to 3100.

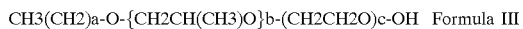

CH3(CH2)a-O-{CH2CH(CH3)O}b-(CH2CH2O)c-OH  Formula III

Where a=3, 7, 9 or 11; b=4 to 12 and c=8 to 16.

EXAMPLE 1

EVALUATION OF SELECTED TEST COMPOUNDS FOR RELIEVING HYDROPHOBICITY OF PEAT

Products for evaluation were tested by preparing solutions of various concentrations, filling a 90×15 mm round petri dish with the test compound and floating a dried 40×8 mm compressed peat pellet on top of the test solution. The time to wet the pellet completely was recorded in minutes and seconds. Each test solution was replicated three times. Following the initial test the pellets were set aside for drying for use in the test to determine rewetting. Rewetting was determined by placing the air-dried peat pellets in a 90×15 mm petri dish filled with deionized water. Again time required to obtain full hydrature was measured and recorded in minutes and seconds. A control consisting of deionized water was used as a standard to which all other compounds were compared in each test. The numerical values obtained for several representative compounds of the invention and standard compounds used for this purpose are given in Table 1a, Table 1b, and Table 1c. Values are the means of three replicates. Values for the control are dependent upon humidity, temperature and state of the peat used in producing the pellets and are included in each example for comparison. In all cases a standard (Compound 101 or Compound 168) was also included so that a comparison could also be made of surfactant activity between experiments.

TABLE 1a

COMPOUNDS OF FORMULA II.

| Com-pound | | Rate (ppm) | Average Time (Minutes:Seconds) | |
|---|---|---|---|---|
| | | | Initial Wetting | Rewetting |
| Control | | 0 | 14:30 | 16:00 |
| 102 | 25% Ethylene oxide | 250 | 7:30 | 7:00 |
| | capped with 2500 MW | 500 | 6:30 | 6:30 |
| | Propylene oxide | 1000 | 6:00 | 4:30 |
| 101 | 10% Ethylene Oxide | 250 | 6:30 | 5:30 |
| | capped with 3100 MW | 500 | 6:00 | 4:00 |
| | Propylene oxide | 1000 | 5:30 | 3:30 |
| 105 | 45% Ethylene Oxide | 250 | 7:00 | 6:30 |
| | capped with 2500 MW | 500 | 6:00 | 6:00 |
| | Propylene Oxide | 1000 | 5:30 | 4:00 |
| 106 | 80% Ethylene Oxide | 250 | 8:30 | 6:00 |
| | capped with 2500 MW | 500 | 6:30 | 4:00 |
| | Propylene Oxide | 1000 | 5:30 | 3:00 |
| 188 | 10% Ethylene Oxide | 250 | 7:00 | 6:30 |
| | capped with 2500 MW | 500 | 5:30 | 4:45 |
| | Propylene Oxide | 1000 | 6:00 | 3:30 |
| 189 | 20% Ethylene Oxide | 250 | 7:15 | 7:00 |
| | capped with 1700 MW | 500 | 6:00 | 6:30 |
| | Propylene Oxide | 1000 | 5:00 | 4:45 |

All of the compounds listed were effective in reducing hydrophobicity of peat with compound 101 giving the best response wed by compound 102.

TABLE 1b

COMPOUNDS OF FORMULAS II and III.

| Com-pound | | rate (ppm) | Time (minutes) | |
|---|---|---|---|---|
| | | | Wetting | Rewetting |
| Control | | 0 | 42:00 | 34:00 |
| 101 | 15% Ethylene oxide | 250 | 18:30 | 9:30 |
| | capped with 3100 MW | 500 | 17:30 | 7:00 |
| | Propylene Oxide | 1000 | 11:30 | 3:30 |
| 149 | 1,2 Propanediol; | 250 | 24:00 | 9:30 |
| | Oxirane, methyl- | 500 | 20:00 | 8:30 |
| | polymer with Oxirane | 1000 | 15:00 | 4:30 |
| 168 | C4 Alcohol; | 250 | 21:30 | 7:30 |
| | Propoxylated (7–9 Mol); | 500 | 17:30 | 7:00 |
| | Ethoxylated (9–11 Mol) | 1000 | 10:30 | 3:00 |
| 151 | C10–C12 Alcohols; | 250 | 21:30 | 8:30 |
| | Propoxylated (5 Mol): | 500 | 19:00 | 7:30 |
| | Ethoxylated (10 Mol) | 1000 | 12:30 | 4:00 |
| 190 | C8 Alcohol; | 250 | 20:30 | 9:00 |
| | Propoxylated (4–6 Mol) | 500 | 17:30 | 7:00 |
| | Ethoxylated (8–12 Mol) | 1000 | 12:00 | 4:00 |

TABLE 1c

COMPOUNDS OF FORMULAS I and III.

| Com-pound | | Rate(ppm) | Time (Minutes:Seconds) | |
|---|---|---|---|---|
| | | | Wetting | Rewetting |
| Control | | 0 | 37:30 | 34:00 |
| 168 | C4 Alcohol; | 250 | 18:00 | 7:00 |
| | Propoxylated (7–9 Mol) | 500 | 16:00 | 6:30 |
| | Ethoxylated (9–11 Mol) | 1000 | 11:00 | 3:00 |

TABLE 1c-continued

COMPOUNDS OF FORMULAS I and III.

| Compound | | Rate(ppm) | Time (Minutes:Seconds) Wetting | Rewetting |
|---|---|---|---|---|
| 154 | MW 1950 Propylene oxide; 20% Ethylene oxide | 250 | 26:30 | 9:30 |
| | | 500 | 19:30 | 6:30 |
| | | 1000 | 15:30 | 4:00 |
| 155 | MW 1950 Propylene oxide; 10% Ethylene oxide | 250 | 26:30 | 11:00 |
| | | 500 | 19:30 | 5:30 |
| | | 1000 | 16:00 | 3:00 |

All three classes of compounds were effective in reducing hydrophobicity of peat moss. In general the selected compounds of Formula III were superior to the selected compound of Formula II. Compounds of Formula I had good properties but in general were not as effective as those of Formulas II and III.

In the next test, selected compounds of the present invention were tested to show their superiority over materials currently availible. The numerical values obtained are summarized in Table 1d.

TABLE 1d

Comparison of selected compounds of the invention to products commercially available in the industry for this utility.

| Compound | | Rate (ppm) | Time (Minutes) Wetting | Rewetting |
|---|---|---|---|---|
| Control | | 0 | 26:30 | 22:30 |
| 101 | 10% Ethylene Oxide capped with 3100 MW Propylene oxide | 250 | 14:00 | 6:30 |
| | | 500 | 12:00 | 4:00 |
| | | 1000 | 9:30 | 2:30 |
| 102 | 20% Ethylene Oxide capped with 2500 MW Propylene Oxide | 250 | 19:30 | 7:30 |
| | | 500 | 15:00 | 5:00 |
| | | 1000 | 12:00 | 3:30 |
| 168 | C4 Alcohol, Propoxylated (7–9 Mol); Ethoxylated (9–11 Mol) | 250 | 18:00 | 6:00 |
| | | 500 | 17:00 | 5:00 |
| | | 1000 | 12:00 | 3:30 |
| 151 | C10–12 Alcohol, Propoxylated 5 Mol; Ethoxylated 10 Mol. | 250 | 17:30 | 9:30 |
| | | 500 | 14:30 | 8:00 |
| | | 1000 | 11:30 | 4:30 |
| 154 | MW 1950 Propylene Oxide; 20% Ethylene Oxide | 250 | 18:00 | 15:00 |
| | | 500 | 14:30 | 13:15 |
| | | 1000 | 11:30 | 4:00 |
| A. | 2,4 diamlyphenol 9 ethoxylate | 250 | 11:00 | 10:45 |
| | | 500 | 10:45 | 6:50 |
| | | 1000 | 10:35 | 5:15 |
| B. | Nonyl Phenol 9 ethoxylate | 250 | 12:00 | 19:10 |
| | | 500 | 10:00 | 9:00 |
| | | 1000 | 9:30 | 7:30 |
| C. | 50% Nonyl Phenol 9 ethoxylate; 50% Tall Oil Rosin ethoxylates | 250 | 18:00 | 18:15 |
| | | 500 | 12:00 | 10:00 |
| | | 1000 | 8:30 | 8:30 |

The selected compounds; numbers 101, 102, 168 and 151 were superior in performance in terms of rewetting to the current products available as given by Compounds A, B and C while Compound 154 was superior to Compound C.

EXAMPLE 2

REDUCTION OF HYDROPHOBICITY OF COMPOSTED BARK BY SELECTED MEMBERS OF THE PREFERRED COMPOUNDS

Reduction of hydrophobicity for composted bark was tested in a manner similar that for Peat. Composted bark was obtained from a commercial manufacturer, sized to particles less than 200 mm using an ASTM standard number 10 Sieve. Samples of the dried bark were then treated with the appropriate level of the preferred compounds, air-dried to 18–20% moisture content following which 200 cc of each sample were placed in a 60×130 mm tall cylinder (percolation tube) to which a screen had been affixed at one end to hold the sample in place. The percolation tube was tapped several times to insure even settling of the samples. The tube was next secured to a ring stand by means of a clamp in an upright position and a 600 ml graduated beaker was placed under the bottom to collect any effluent. Next 200 ml of distilled water was added slowly to the top of the tube and the effluent collected and measured in the beaker below. The ml of water retained by the 200 cc sample was recorded. The sample was then removed from the tube, broken apart and examined visually to determine the % of the bark that was wet. Results for this test are given in Table 2.

TABLE 2

Reduction of Hydrophobicity of bark by various selected compounds. Values are the means of two replicates.

| Compound | | Rate (ppm) | ml of 200 retained by 200 cc of mix. | % Wet |
|---|---|---|---|---|
| Control | | 0 | 25 | 10 |
| 101 | 10% Ethylene Oxide capped with 3100 MW Propylene Oxide | 250 | 65 | 60 |
| | | 500 | 90 | 85 |
| | | 1000 | 95 | 100 |
| 168 | C4 Alcohol; Propoxylated 7–9 Mole; Ethoxylated 9–11 Mole | 250 | 90 | 80 |
| | | 500 | 100 | 100 |
| | | 1000 | 105 | 100 |
| 151 | C10–12 Alcohol; Propoxylated 5 Mole; Ethoxylated 10 Mole. | 250 | 85 | 80 |
| | | 500 | 95 | 95 |
| | | 1000 | 100 | 100 |
| 154 | 20% Propylene Oxide 1950 MW Ethylene Oxide | 250 | 50 | 50 |
| | | 500 | 65 | 75 |
| | | 1000 | 85 | 85 |

EXAMPLE 3

EVALUATION OF SELECTED COMPOUNDS IN REDUCING HYDROPHOBICITY OF ROCKWOOL

To evaluate the effect of compounds on reducing hydrophobicity of rockwool, solutions of various concentrations were prepared and 500 ml placed in a 600 ml beaker. Next, 50×50×80 mm blocks of a rockwool used for horticultural purposes and obtained from the manufacturer were floated on the surface. The time required for the sample to sink into the test solution was recorded following which the samples were removed, drained to remove excess liquid and dried in a microwave oven with frequent turning to insure even distribution of the test solution. The samples were then left for 24 hours following which they were placed in a similar manner in beakers containing distilled water and the time to sink remeasured. Results for selected compounds are shown in Table 3.

TABLE 3

REDUCTION OF HYDROPHOBICITY IN ROCKWOOL USED FOR HORTICULTURAL PURPOSES BY VARIOUS SELECTED COMPOUNDS.

| Compound | | Rate ppm | Initial Wetting Time to Sink; Min:Sec | Rewetting Time to Sink; Min:Sec |
|---|---|---|---|---|
| Control | | 0 | 3:30 | 3:30 |
| 101 | 10% Ethylene Oxide capped with 3100 MW Propylene Oxide | 125 | 1:45 | 0:25 |
| | | 150 | 1:50 | 0:20 |
| | | 300 | 0:50 | 0:10 |
| 102 | 15% Ethylene Oxide capped with 2500 MW Propylene Oxide | 125 | 1:50 | 0:35 |
| | | 150 | 1:50 | 0:40 |
| | | 300 | 1:30 | 0:30 |
| 168 | 4 Carbon Alcohol Propoxylated (7–9 Moles) Ethoxylated (9–11 Moles) | 125 | 1:30 | 0:30 |
| | | 250 | 1:45 | 0:30 |
| | | 300 | 1:00 | 0:25 |
| 151 | 10–12 Carbon Alcohols Propoxylated (5 Mol); Ethoxylated (10 Mol). | 125 | 1:30 | 0:35 |
| | | 250 | 1:25 | 0:30 |
| | | 300 | 0:50 | 0:30 |
| 154 | 20% Ethylene Oxide; 1950 MW Propylene Oxide. | 125 | 2:00 | 0:45 |
| | | 250 | 1:45 | 0:35 |
| | | 300 | 1:30 | 0:30 |

One of the preferred compounds (10% Ethylene Oxide Capped with 3100 MW Propylene Oxide: #101) was next evaluated in a pilot plant study under the manufacturers conditions to determine its effectiveness in comparison with the surfactant which was currently in use (Nonyl phenol 9 ETO). Surprisingly, in addition to its superior performance and crop safety this product also had advantages over the previous technology in that it was much more stable under the conditions of the manufacturing process at one third the rate of the currently used compound and resulted in a substantial gain in the acceptable product as reflected by the percent loss following each batch. The results for this study are given in Table 4.

TABLE 4

PERCENT NOT ACCEPTABLE (LOSS) AS MEASURED BY WETTING PROPERTIES FOR TWO SURFACTANTS AT DIFFERENT RATES USED IN THE MANUFACTURE OF ROCKWOOL PRODUCTS FOR HORTICULTURAL USE.

| Batch | Nonyl Phenol 9ETO 900 PPM | Compound 101 300 PPM |
|---|---|---|
| A | 28% | 5% |
| B | 31% | 8% |
| C | 27% | 8% |

EXAMPLE 4

IMPROVED CROP SAFETY OF COMPOSITIONS OF THE PRESENT INVENTION OVER EXISTING COMMERCIAL STANDARDS

Selected Compounds from those described previously were next evaluated for their crop safety. The most intimate contact that a growing plant can have and the method which most tests a chemicals interaction with sensitive plant processes is exemplified in the following test procedure. The method depends upon seed germination where the basic metabolic pathways are all in early development as well as both cell enlargement and mitotic processes for new cell growth. In addition the chemical is in intimate contact with the seed and newly developing plant tissues without the buffering effect of soil or the surrounding media. The procedure for the test is as follows: A disc of Whatman's #1 Filter Paper is placed in a 90×15 mm Petri dish. Solutions of appropriate concentrates are prepared and a sufficient quantity of the test solution is added to each petri dish so that the filter paper is completely saturated. Any excess liquid is drained off to prevent saturation and anaerobes in the germinating seed. Next 10–12 seeds of *Impatiens sultania*, cv. White Elfin (a species and cultivar with known sensitivity to surfactants) are sown on the filter paper and the glass (or appropriate plastic) dish cover added. The covered dishes are next placed in a growth room with a 12 hour photoperiod with temperature maintained at 20 C. Hydrature within the petri dish is maintained by adding distilled water as need to support plant growth during the course of the experiment. Seed germination and seedling growth are monitored throughout the course of the experiment with data taken at 7 and 14 days after sowing. Morphological anomalies are recorded according to the following scale:

5=no effect/same as control

4=10–15% inhibition of seedling growth: marginally acceptable. hypocotyl and radicle development normal. Seedling expected to produce a normal plant.

3=20–30% inhibition of seedling growth; unacceptable.

2=50% inhibition: radicles emerge, some cell division, root caps may be brown, necrotic or dead.

1=75–90% inhibition of growth; seeds germinate but radicles do not continue mitosis.

0=Seedling death, failure of seed germination

Results for selected compounds are given in Table 5.

TABLE 5

Effects of various surfactants on Seedling Growth and Development of *Impatiens sultania*, cv.White Elvin. Radicles 7 days; hypocotyls 14 days. 0 = no growth: 5 = best.

| Compound | | Rate (ppm) | Plant Growth Response | |
|---|---|---|---|---|
| | | | Radicles | Hypocotyls |
| Control | | 0 | 5.0 | 5.0 |
| 101 | 10% Ethylene oxide capped with 3100 MW Propylene oxide. | 100 | 5.0 | 5.0 |
| | | 250 | 5.0 | 5.0 |
| | | 500 | 4.5 | 5.0 |
| | | 1000 | 3.0 | 3.5 |
| | | 1500 | 3.0 | 3.0 |
| B. | 2,4 diamyl phenol 9 ethoxylate | 100 | 3.5 | 3.5 |
| | | 250 | 2.0 | 2.5 |
| | | 500 | 2.0 | 2.5 |
| | | 1000 | 1.0 | 1.0 |
| C. | 50% Nonylphenol 9 ethoxylate and 50% tall oil ethoxylates | 100 | 2.5 | 3.0 |
| | | 250 | 2.0 | 2.0 |
| | | 500 | 1.0 | 2.0 |
| | | 1000 | 0 | 0 |
| 154 | 1950 MW Propylene Oxide:20% Ethylene Oxide | 250 | 5.0 | 4.5 |
| | | 500 | 4.0 | 3.5 |
| | | 1000 | 4.5 | 3.5 |
| 102 | 20% Ethylene Oxide capped with 2500 MW Propylene Oxide. | 250 | 5.0 | 5.0 |
| | | 500 | 5.0 | 5.0 |
| | | 1000 | 5.0 | 4.0 0 |
| 168 | 4 Carbon Alcohol, Propoxylted(7–9 Mol), Ethoxylated(9–11 Mol). | 250 | 5.0 | 5.0 |
| | | 500 | 4.0 | 4.0 |
| | | 1000 | 3.5 | 3.5 |
| 151 | 10–12 Carbon Alcohol Propoxylated(5 Mol); Ethoxylated(10 Mol). | 250 | 5.0 | 5.0 |
| | | 500 | 4.0 | 4.0 |
| | | 1000 | 4.0 | 4.0 |

Examples of the preferred chemistry and their formulation on amorphous silica were next evaluated in a greenhouse soilless mix for plug production of selected crop species known to be susceptible to wetting agent injury. "Plug production," the practice of germinating seeds in tiny capsules containing the soilless media for subsequent replanting into larger containers, is a standard practice in the industry but is particularly appropriate for demonstrating the effectiveness and safety of the compound as the seed and germinating seedling is grown in a very small ecosystem. The preferred compound and formulation together with other selected materials used as standards was incorporated into the mix at the preferred rate of 3 ounces/cubic yd and at rates of 6 and 9 ounces/cubic yard to demonstrate crop safety over existing materials.

None of the compounds of the present invention caused injury to any of the species tested: Impatiens, Begonia, *Poa pratensis*, Celosia, Lycopersicum, Coleus, Allium or Alyssium at three times the effective use rate of 3 Ounces per cubic yard of mix. The commercial standards were safe to these crops at 2 times the effective use rate to all of the species tested but not to Impatiens, allysium and begonia at three times the recommended effective use rates.

EXAMPLE 5

REDUCTION TO PRACTICE UNDER COMMERCIAL CONDITIONS

To reduce the present invention to practice selected compounds of the present invention were evaluated in cooperation with a commercial manufacturer of soilless mixes.

Two of the selected compounds (#101; 10% Ethylene oxide propoxylated with 3100 MW Propylene oxide and #168; a 4 carbon alcohol; propoxylated 7–9 mol and ethoxylated 9–11 Mol) were prepared as 0.33% solutions and 15 ml of this solution applied to 5 g of "peat moss soilless mix" and mixed for 30 seconds. The product which the manufacturer was currently using (#158: 2,4 diamyl phenol ETO 9) was included as a standard and applied in a similar manner. The control received an equivalent amount of water containing no surfactant and was manipulated in a similar fashion. Following application the treated materials were dried to 10% moisture and evaluated for their ease of wetting by placing a measured amount of the mixture (½ tsp) on the surface of a 6-oz, styrofoam cup filled ⅔ full of water. The time to completely wet the samples was recorded in min:sec with the results as follows:

| Compound | Mean Time to Wet (3 replicates) Min:Sec |
|---|---|
| 101 | 30:25 |
| 168 | 7:15 |
| 158 (standard) | 79:12 |
| Control | >180:00 |

Compounds 101 and 168 of the present invention were clearly superior to the commercial standard, Compound 158, and furthermore gave more consistent results.

Following this test, a plant study using the same rates on commercial quantities of the growing media was conducted with the same results.

EXAMPLE 6

DEVELOPMENT OF A SUPERIOR WATER DISPERSIBLE, DRY FORMULATION FOR APPLYING THE COMPOUNDS OF THE PRESENT INVENTION

It is recognized that the use of corn cob grits, vermiculite, clay and other carriers is a well established procedure for the delivery of dry materials in agricultural and horticultural compositions of effective ingredients. To answer the question of an improved and novel method for delivering these materials as a dry formulation and to meet the needs for a more concentrated product studies were conducted to determine a more effective method for delivery of such materials. An example of the preferred chemistry was incorporated at various levels onto corncob grits, clay, vermiculite and amorphous/hydrous silica.

Examples of the preferred chemistry were incorporated on to selected carriers by placing an appropriate amount of the carrier and an appropriate amount of the desired compound in a cylindrical container which was then placed on a rolling apparatus to simulate the process of a ribbon blender for 30 minutes. Following the blending process the samples were removed and allowed to sit for 24 hours following which they were examined for absorption onto the carrier. A desirable formulation was one which had free flowing characteristics and would pass through a 20 cm diameter×20 cm tall funnel with a 2 cm opening without clogging or bridging.

The prepared formulations were then mixed with a sufficient quantity of peat moss to give the desired concentration of the active ingredient in the final mixture. These samples were then air-dried to 12–15% moisture contents. An equivalent amount of the carrier containing no active ingredient (0 ounces/cubic yard) was also added to act as a control and to demonstrate the effectiveness (or lack of activity) of the carrier and manipulated in the same fashion.

The following test was conducted to simulate conditions of placing the mix in a pot used for growing plants and to determine the number of waterings that a grower would have to perform to get good wetting characteristics in the growth media.

The prepared samples (200 cc) were placed in 6×13 cm tall cylinders to which a wire screen had been affixed on one end to hold the test preparation in place. The cylinders were tamped to insure even settling of the mix and then affixed upright to a ring stand by means of a clamp so that a 250 ml graduated beaker could be placed under the prepared cylinder. Next, 200 ml of water were added slowly to the top of each cylinder to measure the rate of absorption of water by the test mixture. The effluent was collected and measured in the beaker placed below the test cylinder. The resulting effluent was then reapplied until a total of 110 ml of water had been retained by the mix. (This value had been previously determined as the optimum level of water which 200 cc of peat under the conditions of the test could absorb). After each addition of water a representative sample tube was removed (and finally when 110 ml of water had been absorbed) and examined visually to determine the % Wet of the test material. The data are summarized in Table 6 as the number of passes required to obtain complete hydrature of the mix (110 ml absorbed and 100% wet).

TABLE 6

NUMBER OF PASSES REQUIRED TO OBTAIN COMPLETE HYDRATION OF PEAT AS MODIFIED BY VARIOUS SURFACTANT FORMULATIONS AND CARRIERS.

| FORMULATION | FORMU-LATION RATE (ON/YARD) | ACTIVE INGREDIENT RATE (ON/YARD) | NUMBER OF PASSES |
|---|---|---|---|
| 1. Peat Alone (Control) | 0 | 0 | 8.5 |
| 2. Corn Cob grits alone | 16 | 0 | 8.5 |

TABLE 6-continued

NUMBER OF PASSES REQUIRED TO OBTAIN COMPLETE HYDRATION OF PEAT AS MODIFIED BY VARIOUS SURFACTANT FORMULATIONS AND CARRIERS.

| FORMULATION | FORMULATION RATE (ON/YARD) | ACTIVE INGREDIENT RATE (ON/YARD) | NUMBER OF PASSES |
|---|---|---|---|
| 3. Vermiculite Alone | 9 | 0 | 9.0 |
| 4. Silica Alone | 8 | 0 | 8.0 |
| 5. Compound 101 Silica: (50%) | 8 | 4 | 1.0 |
| 6. Compound 101 Silica (50%) | 6 | 3 | 1.5 |
| 7 Compound 101 Silica (50%) | 4 | 2 | 2.5 |
| 8 Compound 101 Corn Cob Grits (15%) | 16 | 4 | 4.0 |
| 9. Compound 101 Vermiculite (40%) | 9 | 4 | 3.0 |
| 10. Compound 168 Silica (50%) | 8 | 4 | 1.0 |
| 11. Compound 168 Silica (50%) | 6 | 3 | 1.0 |
| 12. Compound 168 Silica (50%) | 4 | 2 | 2.5 |
| 13. AquaGro Vermiculite) (A commercial Standard) | 16 | 8 | 3.5 |
| 14. AquGro (Silica) 50% | 16 | 8 | 2.5 |

Neither corn cob grits nor the vermiculite had sufficient absorption capacity to hold the desired concentration (at least 50%) of the desired chemistry. The appigulite clay used in these studies had sufficient absorption capacity but did not perform well in efficacy tests.

The use of an amorphous silica based carrier for compounds of the present invention as well as other products in commerce was clearly superior in performance to the pre-existing technology. The superiority of this carrier was surprising for this utility.

EXAMPLE 7

Finally, it is recognized that compounds and compositions of the present invention have certain unusual physical properties which make them difficult to use under practical conditions due to their incompatibility with aqueous ionic solutions such as fertilizers.

This problem may be overcome by adding an appropriate level from 1–49% but most desirably from 1–15% of a suitable co-solvent, emulsifying agent or dispersing agent such as a mono or di-alkyl phenol ethoxylate or similar materials which are known to the art.

The compounds and compositions of the present invention may be used alone or in combination with each other or with other compositions as described in Example 7 where they are the major component.

What is claimed is:

1. A composition for reducing hydrophobicity of soilless root media used in plant propagation which comprises an admixture of a liquid, water soluble surfactant composition selected from the group consisting of polyoxyalkylenes containing 10 to 20 mole percent of propylene oxide ethoxylated with from 1900 to 2000 molecular weight of Ethylene Oxide, 10 to 80 mole percent of ethylene oxide propoxylated with from 1700 to 3100 molecular weight of propylene oxide, alcohols having 4 to 14 carbon atoms which are propoxylated with from 4 to 12 moles of propylene oxide and ethoxylated with from 8 to 16 moles of ethylene oxide, and mixtures of the same and an amount of amorphous hydrous silica sufficient to form a free flowing mixture thereof, wherein admixing said free flowing mixture with a soilless root media selected from the group consisting of peat moss, bark, rockwool and mixtures of the same enhances the initial and rewettability thereof.

2. A method of delivering horticultural wetting agents to soilless root media used in plant propagation which comprises admixing a liquid, water soluble surfactant composition suitable for reducing hydrophobicity of soilless root media with an amount of amorphous hydrous silica sufficient to form a dry free flowing mixture thereof, and applying said free flowing mixture to said soilless root media, wherein said soilless root media is readily and substantially uniformly wettable by the initial and repeated application of water; wherein said liquid water soluble surfactant composition is selected from the group consisting of polyoxyalkylenes containing 10 to 20 mole percent of propylene oxide ethoxylated with from 1900 to 2000 molecular weight of Ethylene Oxide, 10 to 80 mole percent of ethylene oxide propoxylated with from 1700 to 3100 molecular weight of propylene oxide, alcohols having 4 to 14 carbon atoms which are propoxylated with from 4 to 12 moles of propylene oxide and ethoxylated with from 8 to 16 moles of ethylene oxide, and mixtures of the same, and wherein application of said free flowing mixture to said soilless root media enhances the initial wettability and rewettability thereof.

* * * * *